United States Patent [19]
Ogihara et al.

[11] 3,970,722
[45] July 20, 1976

[54] METHOD FOR PREPARING A MODIFIED CRYSTALLINE PROPYLENE POLYMER

[75] Inventors: Sadahide Ogihara, Fujisawa; Yoichi Nakamura, Yono; Osamu Fukui, Toyonaka, all of Japan

[73] Assignee: UBE Industries, Ltd., Tokyo, Japan

[22] Filed: Feb. 14, 1975

[21] Appl. No.: 549,863

[30] Foreign Application Priority Data
Mar. 5, 1974  Japan................................ 49-24811

[52] U.S. Cl............................................ 260/878 R
[51] Int. Cl.² ...................................... C08F 255/02
[58] Field of Search ................................ 260/878 R

[56] References Cited
UNITED STATES PATENTS
3,290,415   12/1966   Tanner........................... 260/878 R

FOREIGN PATENTS OR APPLICATIONS
230,002   8/1960   Australia......................... 260/878 R
21,493    9/1969   Japan............................. 260/878 R
1,032,505 6/1966   United Kingdom............. 260/878 R

*Primary Examiner*—Alan Holler

[57] ABSTRACT

A modified crystalline propylene polymer usable as a bonding material is prepared by uniformly admixing a crystalline propylene polymer, for example, isotactic polypropylene and propylene-ethylene block or random copolymer, with at least (*a*) one modifying agent of the formula (I) or (II):

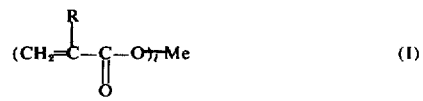

(I)

or

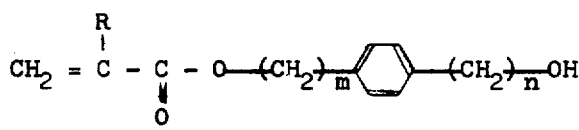

wherein R represents a hydrogen atom or methyl radical, Me represents a Metal atom selected from Groups I, II, III and VIII in the Periodic Table, $l$ represents an integer corresponding to the valence of the Metal atom Me, and $m$ and $n$ each represent 0 or 1, and (*b*) an organic peroxide, and heating the above admixture at a temperature not lower than the melting point and not higher than the thermal decomposing point of said crystalline propylene polymer.

12 Claims, 3 Drawing Figures

Fig. 3

METHOD FOR PREPARING A MODIFIED CRYSTALLINE PROPYLENE POLYMER

The present invention relates to a method for preparing a modified crystalline propylene polymer, more particularly, a modified crystalline propylene polymer usable as a bonding material capable of bonding various articles made of metals, for example, aluminum, copper, iron, steel or zinc, paper, synthetic resins, glass, fabric, leather and ceramics to each other.

It is well-known that crystalline propylene polymers, for example, isotactic polypropylene and isotactic propylene-ethylene copolymers, have various valuable industrial uses, because of their excellent chemical, physical and electrical properties. However, it is also well-known that propylene polymers are excluded from use as bonding materials on account of their poor bonding properties due to the non-polarity of the propylene polymer molecules.

An object of the present invention is to provide a method for preparing a modified crystalline propylene polymer usable as a bonding material.

Another object of the present invention is to provide a method for preparing a modified crystalline propylene polymer having excellent bonding properties as well as chemical, physical and electrical properties similar to those of non-modified crystalline propylene polymers.

According to the present invention, the above-mentioned objects can be accomplished by preparing a modified crystalline propylene polymer usable as a bonding material which comprises heating a crystalline propylene polymer uniformly mixed with a modifying composition consisting of (a) at least one modifying agent selected from the ethylenically unsaturated organic compounds of the formulas (I) and (II):

and wherein R represents a hydrogen atom or methyl radical, Me represents a Metal atom selected from Groups I, II, III and VIII in the Periodic Table, $l$ represents an integer corresponding to the valence of the Metal atom Me, and $m$ and $n$ represent 0 or 1 respectively, and (b) at least one organic peroxide, at a temperature lower than the thermal decomposing point but not lower than the melting point of said crystalline propylene polymer.

The modified crystalline propylene polymer produced by the method of the present invention has excellent bonding properties previously unattainable in ordinary crystalline propylene polymers.

The crystalline propylene polymer usable for the method of the present invention may be selected from the group consisting of isotactic polypropylene, random and block copolymers of at most 30% by weight of at least one α-olefin other than propylene and the balance propylene, mixtures of at most 30% by weight of at least one polymer of an α-olefin other than propylene with the balance isotactic polypropylene, or a mixture of two or more of the above-mentioned polymer mixtures. The above-mentioned α-olefin other than propylene may be either ethylene or butene-1.

It is particularly preferable that the crystalline propylene polymer be selected from the group consisting of random and block copolymers of 2 to 15% by weight of ethylene with the balance propylene, and mixtures of 80% by weight or more of the above-mentioned random or block copolymer with the balance high density polyethylene.

It is desirable that the crystalline propylene polymer used for the method of the present invention should not contain any additive which may be decomposed by the organic peroxide or by heat, and may produce an undesirable color or odor when the polymer is heated to a temperature higher than its melting point.

In compounds of the formula (I), the Metal atom Me may be selected from the group consisting of Na, K, Cu, Mg, Ca, Ba, Zn, Al, Fe, Co and Ni. Particularly, the compound of formula (I) usable for the method of the present invention may be selected from the group consisting of acrylic and methacrylic salts of Na, Ca, Mg, Zn, Al and Fe (III), that is, sodium acrylate, sodium methacrylate, calcium acrylate, calcium methacrylate, magnesium acrylate, magnesium methacrylate, zinc acrylate, zinc methacrylate, aluminum acrylate, aluminum methacrylate, ferric acrylate and ferric methacrylate. The above compounds may be used alone or as a mixture of two or more of the above compounds.

The compound of the formula (II) usable as the modifying agent for the method of the present invention may be selected from the group consisting of 4-acryloyl-oxyphenol, 4-(acryloyloxymethyl) phenol, 4-acryloyloxybenzyl alcohol, 4-methacryloyloxyphenol, 4-(methacryloyloxymethyl) phenol, 4-methacryloyloxybenzyl alcohol, and 4-(methacryloyloxymethyl) benzyl alcohol. The above compounds may be used alone or in the state of a mixture of two or more of the above compounds. Further, one or more of the compounds of formula (I) may be mixed with one or more of the compounds of formula (II). In the method of the present invention, the modifying agent is used in an amount of 0.1 to 7%, preferably from 0.5 to 5%, based on the weight of the crystalline propylene polymer to be modified.

The organic peroxide usable for the method of the present invention is selected from peroxide compounds possessing a one minute half-life temperature of about 160°C to 240°C. The term "one minute half-life temperature" used herein refers to the temperature at which the half-life period of the peroxide is one minute. The organic peroxide may be selected from the group consisting of tert-butyl peroxyisopropyl carbonate, di-tert-butyl-di-peroxyphthalate, tert-butyl peroxyacetate, 2,5-dimethyl-2,5-di(benzoylperoxy) hexene-3, tert-butyl peroxylaurate, tert-butyl peroxymaleic acid, tert-butyl peroxybenzoate, methylethylketone peroxide, dicumyl peroxide, cyclohexanone peroxide, tert-butylcumyl peroxide and mixtures of two or more of the above-mentioned peroxide compounds. The amount of the organic peroxide to be mixed with the modifying agent is determined in response to the type of organic peroxide, the type of modifying agent, the melt flow index of the crystalline propylene polymer to be modified, and the desired melt flow index of the modified crystalline propylene polymer to be prepared. The organic peroxide is generally used in an amount of 0.1 to 5%, preferably from 0.25 to 3.0%, based on the weight of the crystalline propylene polymer to be modified. It is preferable that the organic peroxide should decompose completely during the preparation of the modified propylene polymer at a temperature not lower than the melting point of the crystalline propylene polymer. This is important in preventing the decomposition of the modified propylene polymer and the additive therein, for example, fresh crystalline propylene polymer, anti-oxidant and pigment, during the bonding period. It is preferable that, in the modifying composition, the organic peroxide be present in an amount between about 5% and about 80% based on the weight of the modifying agent.

If the modifying agent and the organic peroxide respectively are present in amounts smaller than the lower limits defined above, the crystalline propylene polymer will be insufficiently modified and, therefore, the resultant modified crystalline propylene polymer will have poor bonding properties.

On the other hand, even if the amounts of the modifying agent and the organic peroxide respectively are larger than the upper limits as defined hereinbefore, there will be no increase in the bonding strength of the modified propylene polymer. Further, an excessive amount of modifying agent results in the formation, in the resultant modified propylene polymer, of a gel consisting of an interpolymer of the modifying agent itself. This gel causes reduction in the bonding strength of the modified propylene polymer. Also, an excessive amount of organic peroxide will result in an excessive large melt flow index of the modified propylene polymer. Such a large melt flow index creates difficulties in melt-shaping the modified propylene polymer.

The modifying composition is uniformly admixed with the crystalline propylene polymer in a conventional admixing apparatus, for example, a rotary mixer or blender. The admixture is heated to a temperature lower than the thermal decomposing point, that is, from about 270° to 340°C but not lower than the melting point of the crystalline propylene polymer, that is, from about 140° to 170°C, in order to modify the crystalline propylene polymer with the modifying composition. The modification is preferably carried out at a temperature of 180° to 250°C over a period of time sufficient for modifying the propylene polymer. In the simplest procedure, the admixture is charged into an extruder, heated at the above-mentioned temperature to melt the admixture, and the melt is extruded through a die. The extruded melt is solidified by cooling. If the temperature of the admixture during the modification period is lower than the melting point, or higher than the thermal decomposing point of the crystalline propylene polymer to be modified, the resultant modified propylene polymer will have excessively low bonding properties.

The modified crystalline propylene polymer prepared according to the method of the present invention has a melt flow index of preferably 120 or less and may be mixed with a small amount of a conventional additive, for example, an antioxidant agent, a plasticizer, an anti-static agent or coloring matter. If it is difficult to shape the modified crystalline propylene polymer in the desired fashion due to an excessively high flow index, for example, one higher than 120, the modified crystalline propylene polymer may be mixed with a non-modified crystalline propylene polymer in an amount of 50% or less, based on the weight of the modified polymer, in order to reduce said melt flow index. The modified crystalline propylene polymer may be finely divided by a mechanical apparatus, for example, a crusher and grinder, to form a powder or may be formed into a thin film by a film-forming apparatus, for example, an extruder with a T-die or a blown film-forming apparatus. The modified crystalline propylene polymer powder or film has excellent capacities for bonding various articles made of, for example, a metal, (for instance, aluminum, copper, zinc, lead, nickel, iron, stainless steel, carbon steel and alloys containing one or more of the above-mentioned metals) paper; synthetic resins; glass; slate; plywood; leather; fabric; and ceramic material. Accordingly, the modified crystalline propylene polymer can be used as bonding material in the form of a powder or a film for the above-mentioned articles or deposited under vacuum conditions on the shaped article.

Generally, commercial metal plates can be employed for the process of the present invention. The surfaces of the commercial metal plates are usually stained with grease or an oily substance. Accordingly, preliminary degreasing and cleaning of the surfaces of the commercial metal plates to be bonded by the bonding material of the present invention is preferable. Such degreasing can be carried out in accordance with any conventional method. For example, said degreasing may be effected using the apparatus shown in FIGS. 1 or 2.

The features and advantages of the present invention will become more apparent upon reading the detailed description set forth hereinbelow and referring to the accompanying drawings, in which.

Figure 1:
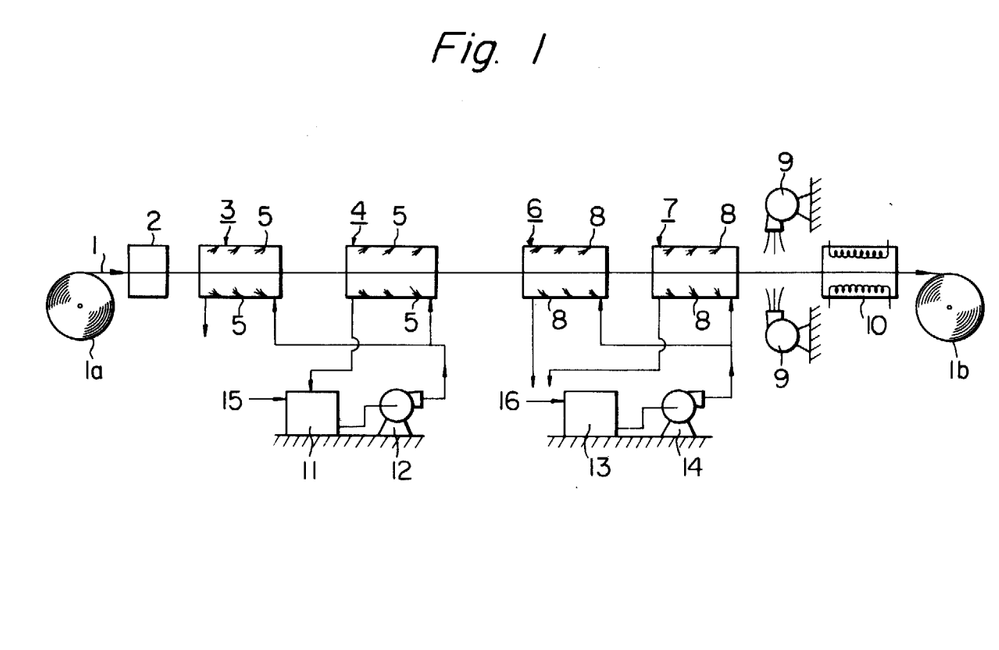
FIG. 1 is a schematic view of an apparatus performing a preliminary step for continuously degreasing aluminum, copper, zinc or iron plates which are to be bonded with the modified propylene polymer of the present invention.

Referring to FIG. 1, a metal plate 1 consisting of aluminum, copper, zinc, lead, nickel, iron or steel is continuously fed from a roll 1a to a pre-washing stage 3 and a main washing stage 4. During the period of plate 1's passing through washing stages 3 and 4, both the upper and lower surfaces of said plate 1 are washed with a washing liquid ejected thereto from nozzles 5 located above and beneath the travel path of plate 1. As is indicated in FIG. 1, these nozzles 5 are positioned at an angle of about 30° with respect to the direction in which the plate is fed. The washing liquid consists of, for example, an aqueous solution of 0.5 to 5% by weight of a composition of 43 to 67% by weight of sodium metasilicate, 15 to 25% by weight of sodium tertiary phosphate, 15 to 25% by weight of sodium tripolyphosphate, 3 to 7% of a non-ionic surface active agent, for example, an oleyl polyoxyethylene ether wherein the polyoxyethylene moiety consists of 20 to 30 ethylene oxide units. The washing liquid is maintained at a temperature of 30° to 80°C and stored in a washing liquid vessel 11. The washing liquid in the vessel 11 is supplied to nozzle 5 by means of a pump 12. Waste washing liquid in the main washing stage 4 is recycled to vessel 11, whereas waste washing liquid in the pre-washing stage 3 is discharged from stage 3. An amount of fresh washing liquid the same as the amount of the waste washing liquid discharged from the stage 3 is supplied to vessel 11 through a supply conduit 15.

After passing through the main washing stage 4, the metal plate 1 is fed into a pre-water-rinsing stage 6 and a main water-rinsing stage 7. Within stages 6 and 7, the plate is rinsed with water ejected thereto from nozzles 8 in the same manner as mentioned above. The rinsing water is supplied into a vessel 13 through a water supply conduit 16 and maintained a vessel 13 through a water supply conduit 16 and maintained therein at a temperature between room temperature and 80°C. The rinsing water is fed from vessel 13 to nozzle 8 by means of a pump 14, and the waste rinsing water is discharged from rinsing stages 6 and 7.

After the water-rinsing is completed, the water on the two surfaces of plate 1 is blown or evaporated off by air jet generated by a pair of blowers 9, and plate 1 is completely dried in a drying chamber 10. Dried plate 1 is then rolled up into a roll 1b.

If plate 1 has rust formed on the surfaces thereof, it is preferable that the plate be fed into a rust-removing stage 2 located prior to the pre-washing stage 3. In the rust-removing stage 2, the rust on the metal plate 1 is mechanically removed by means of sand-brushing.

Figure 2:
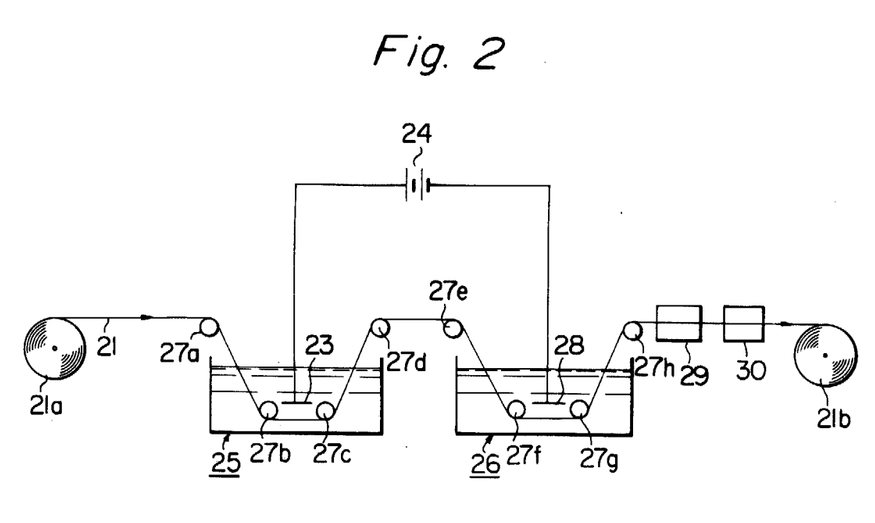
FIG. 2 is a schematic view of a continuous apparatus for degreasing stainless steel plates which are to be bonded with the modified propylene polymer of the present invention.

If stainless steel plates are bonded by the bonding material of the present invention, it is preferable that the stainless plates be degreased by an electrolytic cleaning method using an apparatus such as that shown in FIG. 2, because the apparatus of FIG. 1 is unsatisfactory for completely degreasing the stainless steel plates.

Referring to FIG. 2, a stainless steel plate 21 is drawn off from a roll 21a and fed into a cleaning apparatus composed of a first electrolytic cleaning vessel 25, a second electrolytic cleaning vessel 26, a water-rinsing stage 29 and a drying stage 30 which are successively located along the travel path of the plate 21. The first and second vessels 25 and 26 respectively include therein an electrolytic solution consisting of a 3 through 5% aqueous solution of a composition containing 47 to 53% by weight of sodium metasilicate, 27 to 35% by weight of sodium carbonate, 5 to 10% by weight of sodium tertiary phosphate and 2 to 21% by weight of a non-ionic surface active agent, for example, oleyl polyoxyethylene ether in which the polyoxyethylene moiety consists of 20 to 30 polymerized ethylene oxide units. The electrolytic solution is maintained at a temperature of 60° to 80°C. An anode plate 23 is placed in the electrolyte solution in the first vessel 25 in such a manner that the anode plate 23 faces the plate 21 travelling through the first vessel 25. The anode plate 23 is electrically connected to an electric source 24. A cathode plate 28 is placed in the electrolytic solution in the second vessel 26, in the same manner as that of the anode 23, and electrically connected to the electric source 24. The plate 21, drawn off from the roll 21a, is fed to the first vessel 25 through a guide roller 27a, travels through the first vessel 25 by the guidance of rollers 27b and 27c and then, is drawn off therefrom guided by a roller 27d. Thereafter, the plate 21 is fed into the second vessel 26 through a guide roller 27e, travels therethrough guided by rollers 27f and 27g and, then, is withdrawn therefrom guided by a roller 27h. During the travelling period of plate 21 in the first and second vessels 25 and 26 respectively a direct current flows between the anode 23 or cathode 28 and plate 21 in a current density of 300 to 1,000 ampere/m². The travel velocity of plate 21 is adjusted in such a manner that the total time of residence of plate 21 in the first and second vessels 25 and 26, wherein said plate 21 is subjected to electrolytic cleaning, is 15 to 60 seconds. The current density between the anode 23 or cathode 28 and plate 21 can be changed by varying the distance therebetween.

The plate 21, cleaned as mentioned above, is fed into the water-rinsing stage 29 to remove the electrolytic solution therefrom and then into the drying stage 30 where the plate 21 is completely dried. The dried plate 21 is rolled up into a roller 21b. The stainless steel plate 21, cleaned and dried as mentioned above, is in a suitable condition for being firmly and continuously bonded with the bonding material of the present invention.

In order to produce a composite plate composed of two or more metal plates bonded to each other by the bonding material, of the present invention the powder or film of the modified crystalline propylene polymer is interposed, preferably, in an amount of 0.003 to 0.02 g/cm², between the metal plates, and the composite plate thus initially formed is heated and pressed by a heat-pressing machine, for example, a compression molding machine or roll pressing machine, at a temperature of between 170° and 240°C, preferably from 190° to 220°C, under a pressure of about 3 to 100 kg/cm² for a period ranging from 0.1 seconds to 5 minutes.

Figure 3:
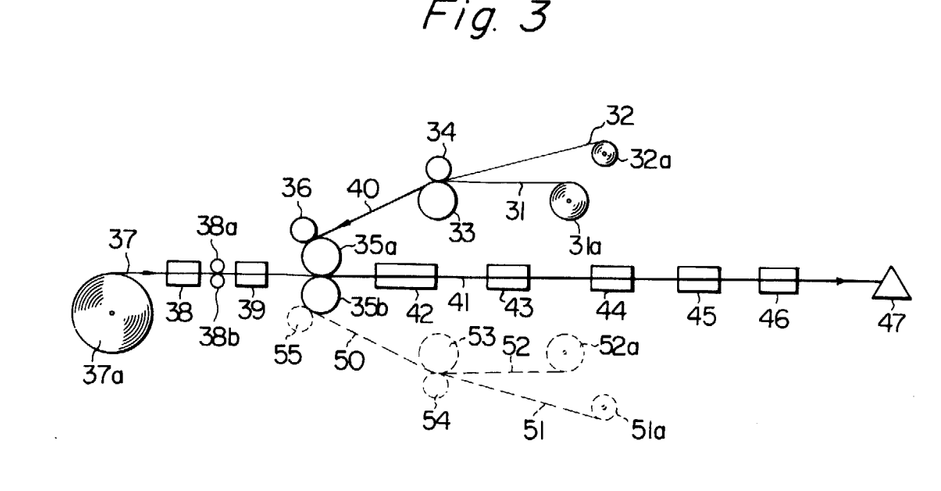
FIG. 3 is a schematic view of a continuous apparatus for producing a composite plate by using as a bonding material the modified propylene polymer of the present invention.

The composite plate composed of two or more metal plates bonded to each other by the modified propylene polymer bonding material may be continuously produced by, for example, an apparatus as shown in FIG. 3.

Referring to FIG. 3, a metal plate 31 which has been degreased, is drawn off from a roll 31a, and a film 32 consisting of the modified propylene polymer of the present invention is drawn off from a roller 32a. Film 32 and plate 31 are fed to a pair of nip rollers 33 and 34 so that said film 32 and said plate 31 are superimposed on each other. The lower roller 33 of the nip rollers is a heating roller to heat the metal plate 31 to a temperature of between 130° and 160°C. The metal plate 31 may be heated in place of the heating roller 33, by a heating device located prior to the nip rollers 33 and 34.

Plate 31 and film 32 are brought into close contact with each other by the nip rollers 33 and 34, without an air layer forming therebetween, and are bonded to each other. After passing through nip rollers 33 and 34, plate 31 and film 32 are converted to a provisional composite plate 40.

The other metal plate 37 which has been completely degreased, is drawn off separately from a roll 37a and fed into a leveller 38 where deformations created in the plate 37 are eliminated. The plate 37 is, then, fed to a pre-heater 39 through a pair of nip rollers 38a and 38b, and pre-heated to a temperature of 180° to 250°C. The provisional composite plate 40 is fed to a pair of nip rollers 35a and 35b by means of a roller 36 which rotates together with the upper roller 35a. The preheated plate 37 is also fed to the nip rollers 35a and 35b and pressed together with the provisional composite plate 40. The resultant composite plate 41 is composed of the plate 31 and the plate 37 bonded to each other by film 32. The composite plate 41 is further pressed and heated in a heat-pressing stage 42 at a temperature of 170° to 240°C under a pressure of 3 to 100 kg/cm² for 0.1 seconds to 5 minutes. In a first cooling stage 43, the composite plate 41 is cooled to a temperature of about 100°C while being pressed with nip rollers (not shown) so as to prevent deformation of the composite plate 41. Thereafter, the composite plate 41 is cooled to room temperature in a second cooling stage 44. The cooled composite plate 41 is fed into a cutting stage 45 wherein edge portions of the composite plate 41 are cut so as to adjust the composite plate to a desired size. Thereafter, the composite plate 41 is further fed to a leveller 46 to eliminate the deformation created therein. The stress-released composite plate 41 is fed into a finishing stage 47 where the composite plate 41 is rolled up or cut to a desired size.

In order to prepare a five-component composite plate composed of three metal plates bonded by two bonding material layers inserted therebetween, a provisional composite plate 50 is prepared by the same method as that used for the provisional composite plate 40 in the apparatus shown by dotted lines in FIG. 3. That is, a metal plate 52 and a bonding film 51 consisting of a modified propylene polymer of the present invention are respectively drawn off from a roller 52a and a roller 51a and bonded to each other by a pair of nip rollers 53 and 54. The resultant provisional composite plate 50 is fed to the nip rollers 35a and 35b through a roller 55 rotating together with the lower roller 35b. The provisional composite plate 50 is incorporated between nip rollers 35a and 35b, with the provisional composite plate 40 and the preheated metal plate 37 in such a manner that the bonding film 51 in the provisional composite plate 50 and the bonding film 32 in the provisional composite plate 40 respectively come into contact with the upper and lower surfaces of the metal plate 37. The resultant composite plate is processed by the same method as mentioned hereinbefore.

In the above-mentioned five-component composite plate, the metal plate 37 located in the middle portion of the composite plate may be replaced by a resinous plate, for example, a polypropylene sheet. When this type of composite plate is produced by the apparatus of FIG. 3, the leveller 38 and the preheater 39 may be omitted from the apparatus.

The features and advantages of the present invention will be further illustrated by the following examples which are given by way of illustration of and not as limitations of the Scope of the Present Invention. In the examples, all parts and percentages are by weight unless otherwise stated.

In the following examples, the melt flow index (M.I.) was determined in accordance with the method of ASTMD-1238, the resistance of an adhesive to T-peeling was determined in accordance with the T-peel test method of ASTM D-1876, and the resistance to peeling at an angle of 180° was determined in accordance with the test method of ASTM D-903.

Examples 1 through 6

In each of Example 1 through 6, an ethylene-propylene block copolymer consisting of 8% by weight of copolymerized ethylene and the balance of copolymerized propylene and having a melt flow index of 1.0 and a melting point of about 165°C, was uniformly mixed with a modifying composition consisting of zinc acrylate and tert-butyl peroxybenzoate in the amounts indicated in Table 1. The mixture was fed into an extruder and melted at a temperature of 220°C for about 5 minutes to modify the block copolymer. The modified block copolymer melt was extruded from the extruder through a die and cut to form pellets of 2 mm in diameter and 3 mm in length. 100 parts of the modified block copolymer pellets were uniformly mixed with 0.1 part of tetrakis methylene-3-(3,5-di-tert-butyl-4-hydroxyphenyl) propionate methane. The mixture was supplied to a T-die type film-making apparatus. In the apparatus, the mixture was melted at a temperature of 240°C and the melt extruded through a T-die to form a film, the said film drawn up to an average thickness of 100 μ.

Two pieces of commercial aluminum plate (A1100P H12, made by Nippon Keikinzoku, K.K.) of 0.1 mm thickness were immersed in trichloroethylene at a temperature of 50°C to remove greasy substances thereon, and then dried at room temperature.

The modified block copolymer film was interposed between the aluminum plates to form a precursory composite plate.

The precursory composite plate was placed on a compression moulding machine, preheated at a temperature of 220°C for about 1 minute and, then, pressed at the same temperature under a gauge pressure of 10 kg/cm² for approximately 4 minutes. After the completion of pressing, the resultant composite plate was cooled with water. The composite plates thus produced had resistances to T-peeling as indicated in Table 1.

Table 1

| Item | Proportion (part) | | Resistance to T-peeling (kg/cm) |
|---|---|---|---|
| Example | Zinc Acrylate | tert-Butyl peroxybenzoate | |
| 1 | 1.0 | 0.5 | 2.8 |
| 2 | 3.0 | 0.5 | 4.1 |
| 3 | 5.0 | 0.5 | 4.0 |
| 4 | 1.0 | 1.0 | 2.5 |
| 5 | 3.0 | 1.0 | 3.8 |
| 6 | 5.0 | 1.0 | 3.9 |

Examples 7 through 12

In each example, operations identical to those in Example 1 were repeated using instead of tert-butyl peroxybenzoate, 2,5-dimethyl-2,5-di(benzoylperoxy) hexene-3 in an amount as indicated in Table 2, as the organic peroxide. Zinc acrylate was also used in the amount indicated in Table 2. The results are likewise indicated in Table 2.

Table 2

| Item | Proportion (part) | | Resistance to T-peeling (kg/cm) |
|---|---|---|---|
| Example | Zinc Acrylate | 2,5-Dimethyl-2,5-di(benzoylperoxy) hexene-3 | |
| 7 | 1.0 | 0.5 | 2.0 |
| 8 | 3.0 | " | 3.3 |
| 9 | 5.0 | " | 3.9 |
| 10 | 1.0 | 1.0 | 3.0 |
| 11 | 3.0 | " | 3.5 |
| 12 | 5.0 | " | 4.0 |

Examples 13 through 18

In each example, the same procedures as those in Example 1 were repeated using zinc methacrylate and tert-butyl peroxybenzoate in amounts as indicated in Table 3. The results are likewise shown in Table 3.

Table 3

| Item Example | Proportion (part) Zinc Methacrylate | tert-buthyl peroxybenzoate | Resistance to T-peeling (kg/cm) |
|---|---|---|---|
| 13 | 1.0 | 0.5 | 3.5 |
| 14 | 3.0 | '' | 4.2 |
| 15 | 5.0 | '' | 4.0 |
| 16 | 1.0 | 1.0 | 3.2 |
| 17 | 3.0 | '' | 4.0 |
| 18 | 5.0 | '' | 4.2 |

Examples 19 through 24

In each example, the same operations as those in Example 1 were carried out, except that zinc methacrylate and 2,5-dimethyl-2,5-di-(benzoylperoxy) hexene-3 respectively were used in amounts as indicated in Table 4 instead of the zinc acrylate and tert-butyl peroxybenzoate. The results are likewise indicated in Table 4.

Table 4

| Item Example | Proportion (part) Zinc Methacrylate | 2,5-Dimethyl-2,5-di(benzoylperoxy) hexene-3 | Resistance to T-peeling (kg/cm) |
|---|---|---|---|
| 19 | 1.0 | 0.5 | 3.7 |
| 20 | 3.0 | '' | 4.0 |
| 21 | 5.0 | '' | 4.3 |
| 22 | 1.0 | 1.0 | 3.5 |
| 23 | 3.0 | '' | 3.9 |
| 24 | 5.0 | '' | 3.9 |

Examples 25 through 30

In each example, procedures identical to those of Example 1 were repeated, except that aluminum acrylate and tert-butyl peroxybenzoate were used in amounts as indicated in Table 5. The results are similarly indicated in Table 5.

Table 5

| Item Example | Proportion (part) Aluminum Acrylate | tert-Butyl peroxybenzoate | Resistance to T-peeling (kg/cm) |
|---|---|---|---|
| 25 | 1.0 | 0.5 | 3.2 |
| 26 | 3.0 | '' | 4.0 |
| 27 | 5.0 | '' | 4.2 |
| 28 | 1.0 | 1.0 | 3.3 |
| 29 | 3.0 | '' | 4.0 |
| 30 | 5.0 | '' | 3.9 |

Examples 31 through 36

In each of the present examples, the same procedures as those in Example 1 were repeated except that aluminum acrylate, instead of Zinc acrylate, and 2,5-dimethyl-2,5-di(benzoylperoxy) hexene-3 instead of tert-butyl peroxybenzoate, were used in amounts indicated in Table 6. The results are indicated in Table 6.

Table 6

| Item Example | Proportion (part) Aluminum Acrylate | 2,5-Dimethyl-2,5-di(benzoylperoxy)hexene-3 | Resistance to T-peeling (kg/cm) |
|---|---|---|---|
| 31 | 1.0 | 0.5 | 3.0 |
| 32 | 3.0 | '' | 3.5 |
| 33 | 5.0 | '' | 4.0 |
| 34 | 1.0 | 1.0 | 3.0 |
| 35 | 3.0 | '' | 3.3 |
| 36 | 5.0 | '' | 4.0 |

Examples 37 through 42

In each of the present examples, the same operations as those of Example 1 were carried out, except that 4-methacryloyloxyphenol and tert-butyl peroxybenzoate were used in amounts as indicated in Table 7. The results are likewise indicated in Table 7.

Table 7

| Item Example | Proportion (part) 4-Methacryloyl-oxyphenol | tert-Butyl peroxybenzoate | Resistance to T-peeling (kg/cm) |
|---|---|---|---|
| 37 | 1.0 | 0.5 | 6.0 |
| 38 | 3.0 | '' | 6.0 |
| 39 | 5.0 | '' | 5.9 |
| 40 | 1.0 | 1.0 | 5.0 |
| 41 | 3.0 | '' | 5.5 |
| 42 | 5.0 | '' | 5.8 |

Examples 43 through 45

In each of the present examples, the same operations as those of Example 1 were carried out, except that 4-methacryloyloxyphenol and 2,5-dimethyl-2,5-di-(benzoylperoxy) hexene-3 were used in amounts as indicated in Table 8. The results are similarly shown in Table 8.

Table 8

| Item Example | Proportion (part) 4-Methacryloyl-oxyphenol | 2,5-Dimethyl-2,5-di(benzoyl-peroxy)hexene-3 | Resistance to T-peeling (kg/cm) |
|---|---|---|---|
| 43 | 1.0 | 0.5 | 5.5 |
| 44 | 3.0 | '' | 5.8 |
| 45 | 5.0 | '' | 5.5 |

Examples 46 through 48

In each of the examples, the same operations as those of Example 1 were repeated, except that 4-(methacryloyloxymethyl) phenol and tert-butyl peroxybenzoate were used in amounts as indicated in Table 9. The results are indicated in Table 9.

Table 9

| Item Example | Proportion (part) 4-(Methacryloyl-oxymethyl) phenol | tert-Butyl peroxybenzoate | Resistance to T-peeling (kg/cm) |
|---|---|---|---|
| 46 | 1.0 | 0.5 | 5.5 |
| 47 | 3.0 | '' | 5.8 |
| 48 | 5.0 | '' | 5.3 |

Examples 49 through 54

In each of the present examples, the same procedures as those in Example 1 were repeated, except that 4-(methacryloyloxymethyl) phenol and 2,5-dimethyl-2,5-di(benzoylperoxy) hexene-3 were used in amounts as indicated in Table 10. The results are indicated in Table 10.

Table 10

| Item<br>Example | Proportion (part) | | Resistance to T-peeling (kg/cm) |
|---|---|---|---|
| | 4-(Methacryloyl-oxymethyl) phenol | 2,5-Dimethyl-2,5-di(benzoylperoxy) hexene-3 | |
| 49 | 1.0 | 0.5 | 5.3 |
| 50 | 3.0 | " | 5.4 |
| 51 | 5.0 | " | 5.8 |
| 52 | 1.0 | 1.0 | 5.0 |
| 53 | 3.0 | " | 5.3 |
| 54 | 5.0 | " | 5.6 |

Examples 55 through 60

In each of Examples 55, 56 and 57, 100 parts of an ethylene-propylene block copolymer consisting of 8% by weight of copolymerized ethylene and a balance of copolymerized propylene and having a melt flow index of 1.0 and a melting point of about 165°C, was mixed with 3.0 parts of zinc acrylate and 0.5 parts of tert-butyl peroxybenzoate.

The mixture was charged into the same extruder as used in Example 1 and melted under heating for 5 minutes at a temperature as indicated in Table 11. The melt was formed into pellets of 2 mm in diameter and 3 mm in length by the method used in Example 1. The pellets were connected to a film of 100 μ in thickness by the same method as that of Example 1, and the said film then used to bond two pieces of commercial aluminum plates by a method identical to that of Example 1. The composite plate thus produced had a resistance to T-peeling as shown in Table 11.

In each of Examples 58, 59, 60, the same procedures as in Examples 55 were repeated, except that 0.5 parts of 2,5-dimethyl-2,5-di(benzoylperoxy) hexene-3 were used instead of tert-butyl peroxybenzoate, and the block copolymer mixture was melted at the temperature shown in Table 11. The results are indicated in Table 11.

Table 11

| Item<br>Example | Organic Peroxide | | Temp. of Melt (°C) | Resistance to T-peeling (kg/cm) |
|---|---|---|---|---|
| | Type | Amount (part) | | |
| 55 | tert-Butyl | 0.5 | 180 | 3.9 |
| 56 | peroxybenzoate | " | 220 | 4.1 |
| 57 | | " | 240 | 4.0 |
| 58 | 2,5-dimethyl- | " | 180 | 3.3 |
| 59 | 2,5-di(benzoyl- | " | 220 | 3.3 |
| 60 | peroxy)hexene-3 | " | 240 | 3.5 |

Examples 61 through 66

In each of Examples 61, 62, 63, 100 parts of an isotactic polyproylene having a melt flow index of 1.0 and a melting point of about 165°C were mixed with 3.0 parts of zinc acrylate and 0.5 parts of tert-butyl peroxybenzoate, and the mixture was melted at the temperature indicated in Table 12, and subsequently converted to a film 100 μ thick, using the same method as in Example 55. The resultant composite plate had a resistance to T-peeling as indicated in Table 12.

In each of Examples 64, 65 and 66, the same operations as in Examples 61, 62 and 63 were repeated, except that 0.5 parts of 2,5-dimethyl-2,5-di(benzoylperoxy) hexene-3 were used instead of the tert-butyl peroxybenzoate. The results are indicated in Table 12.

Table 12

| Item<br>Example | Organic Peroxide | | Temperature of melt (°C) | Resistance to T-peeling (kg/cm) |
|---|---|---|---|---|
| | Type | Amount (part) | | |
| 61 | tert-Butyl | 0.5 | 180 | 2.5 |
| 62 | peroxy-benzoate | " | 220 | 2.9 |
| 63 | | " | 240 | 2.8 |
| 64 | 2,5-Dimethyl-2,5- | 0.5 | 180 | 2.4 |
| 65 | di(benzoylperoxy) | " | 220 | 2.8 |
| 66 | hexene-3 | " | 240 | 2.5 |

Examples 67 through 69

In each of the present examples, 100 parts of an ethylene-propylene block copolymer consisting of 8% of copolymerized ethylene and a balance of copolymerized propylene and having a melt flow index of 1.0 and a melting point of about 165°C were mixed with 3.0 parts of zinc acrylate and 1.0 part of tert-butyl peroxybenzoate. The same operations as in Example 1 were repeated using the above-mentioned mixture except that the mixture was melted at the temperature indicated in Table 13. The resistances to T-peeling of the resultant composite plates are indicated in Table 13.

Table 13

| Item Example | Temperature of melt (°C) | Resistance to T-peeling (kg/cm) |
|---|---|---|
| 67 | 180 | 3.5 |
| 68 | 220 | 3.9 |
| 69 | 240 | 3.3 |

Examples 70 through 72

In each of the present examples, 100 parts of an isotactic polypropylene having a melt flow index of 1.0 and a melting point of about 165°C were mixed with 3.0 parts of zinc acrylate and 1.0 parts of tert-butyl peroxybenzoate. The same procedures as in Example 1 were repeated using the above mixture except that the mixture was melted at a temperature as shown in Table 14. The results are indicated in Table 14.

Table 14

| Item Example | Temperature of melt (°C) | Resistance to T-peeling (kg/cm) |
|---|---|---|
| 70 | 180 | 3.0 |
| 71 | 220 | 3.2 |
| 72 | 240 | 3.3 |

Examples 73 through 78

In each of Examples 73, 74 and 75, 100 parts of the same ethylene-propylene block copolymer used in Example 55 were mixed with 3.0 parts of aluminum acrylate and 0.5 parts of tert-butyl peroxybenzoate. The operations of Example 55 were repeated, except that the mixture was melted at the temperature indicated in Table 15. The results are indicated in Table 15.

In each of Examples 76 through 78, the same procedures as in Example 73 were repeated except that 0.5 parts of 2,5-dimethyl-2,5-di(benzoylperoxy) hexene-3 were used, and the mixture was melted at a temperature as shown in Table 15. The results are indicated in Table 15.

Table 15

| Item Example | Organic Peroxide Type | Amount (part) | Temperature of melt (°C) | Resistance to T-peeling (kg/cm) |
|---|---|---|---|---|
| 73 | tert-Butyl | 0.5 | 180 | 3.8 |
| 74 | peroxy-benzoate | 0.5 | 220 | 4.0 |
| 75 |  | 0.5 | 240 | 4.0 |
| 76 | 2,5-Dimethyl-2,5- | 0.5 | 180 | 3.5 |
| 77 | di(benzoyl-peroxy) | 0.5 | 220 | 3.5 |
| 78 | hexene-3 | 0.5 | 240 | 3.8 |

Examples 79 through 84

In each of Examples 79, 80 and 81, 100 parts of the same isolatic polypropylene as in Example 61, were mixed with 3.0 parts of aluminum acrylate and 0.5 parts of tert-butyl peroxybenzoate. The procedure used in Example 61 was repeated, except that the above mixture was melted at the temperature indicated in Table 16.

In each of Examples 82 through 84, operations identical to those of Example 79 were repeated, except that 0.5 parts of 2,5-dimethyl-2,5-di(benzoylperoxy) hexene-3 were used to prepare a polypropylene mixture and the above mixture was melted at the temperature indicated in Table 16. The results are indicated in Table 16.

Table 16

| Item Example | Organic Peroxide Type | Amount (part) | Temperature of melt (°C) | Resistance to T-peeling (kg/cm) |
|---|---|---|---|---|
| 79 | tert-Butyl | 0.5 | 180 | 2.2 |
| 80 | peroxy- | 0.5 | 220 | 2.5 |
| 81 | benzoate | 0.5 | 240 | 2.7 |
| 82 | 2,5-Dimethyl-2,5- | 0.5 | 180 | 2.5 |
| 83 | di(benzoylperoxy) | 0.5 | 220 | 2.6 |
| 84 | hexene-3 | 0.5 | 240 | 2.3 |

Examples 85 through 90

In each of Examples 85 through 87, 100 parts of the same block copolymer as in Example 55 were mixed with 3.0 parts of aluminim acrylate and 1.0 part of tert-butyl peroxybenzoate. The same procedures as in Example 55 were repeated, except the above mixture was melted at a temperature indicated in Table 17.

In each of Examples 88, 89, and 90, the same mixture as in Example 85 was prepared except that 100 parts of the same polypropylene homopolymer as used in Example 61 and 1.0 part of 2,5-dimethyl-2,5-di(benzoylperoxy) hexene-3 were used. The same procedures as in Example 55 were repeated, except that the above mixture was melted at a temperature indicated in Table 17. The results are shown in Table 17.

Table 17

| Item Example | Organic peroxide Type | Amount (part) | Temperature of melt (°C) | Resistance to T-peeling (kg/cm) |
|---|---|---|---|---|
| 85 | tert-Butyl | 1.0 | 180 | 3.5 |
| 86 | peroxybenzoate | 1.0 | 220 | 3.8 |
| 87 |  | 1.0 | 240 | 3.3 |
| 88 | 2,5-Dimethyl-2,5- | 1.0 | 180 | 2.5 |
| 89 | di(benzoylperoxy) | 1.0 | 220 | 2.9 |
| 90 | hexene-3 | 1.0 | 240 | 3.0 |

Examples 91 through 96

In each of Examples 91, 92 and 93, 100 parts of the same block copolymer as in Example 55 were mixed with 1.0 part of 4-methacryloyloxyphenol and 0.5 parts of tert-butyl peroxybenzoate. The same operations as in Example 55 were repeated except that the above mixture was melted at the temperature indicated in Table 18.

In each of Examples 94, 95 and 96, the same procedures as in Example 91 were repeated except that 1.0 part of 4-(methacryloyloxymethyl)-phenol was used to prepare the mixture, and the mixture was melted at a temperature indicated in Table 18. The results are shown in Table 18.

Table 18

| Item Example | Modifying agent Type | Amount (part) | Temperature of melt (°C) | Resistance to T-peeling (kg/cm) |
|---|---|---|---|---|
| 91 | 4-methacryloyl- | 1.0 | 180 | 5.5 |
| 92 | oxyphenol | 1.0 | 220 | 6.0 |
| 93 |  | 1.0 | 240 | 5.8 |
| 94 | 4-(Methacryloyl- | 1.0 | 180 | 5.2 |
| 95 | oxymethyl) | 1.0 | 220 | 5.5 |
| 96 | phenol | 1.0 | 240 | 5.6 |

Examples 97 through 102

In each of Examples 97, 98 and 99, 100 parts of the same polypropylene used in Example 61 were mixed with 1.0 part of 4-methacryloyloxyphenol and 0.5 part of tert-butyl peroxybenzoate, and the mixture was subjected to the same operations as those of Example 61, except that said mixture was melted at a temperature as indicated in Table 19.

In each of Examples 100, 101 and 102, a procedure identical to that of Example 97 was repeated, except that a polypropylene mixture containing 1.0 part of 4-(methacryloyloxymethyl) phenol was used instead of 4-methacryloyloxyphenol and melted at a temperature as indicated in Table 19. The results are demonstrated in Table 19.

Table 19

| Item Example | Modifying agent Type | Amount (part) | Temperature of melt (°C) | Resistance to T-peeling (kg/cm) |
|---|---|---|---|---|
| 97 | 4-Methacryloyl- | 1.0 | 180 | 4.0 |
| 98 | oxyphenol | 1.0 | 220 | 4.5 |
| 99 |  | 1.0 | 240 | 4.0 |
| 100 | 4-(Methacryloyl- | 1.0 | 180 | 3.8 |
| 101 | oxymethyl) | 1.0 | 220 | 4.2 |
| 102 | phenol | 1.0 | 240 | 4.0 |

Examples 103 through 105

In each Examples 103, 104 and 105, 100 parts of the same block copolymer used in Example 55 were mixed with 4-methacryloyloxyphenol, in an amount indicated as in Table 20, and 1.0 part of tert-butyl peroxybenzoate to prepare a block copolymer mixture; the said mixture subjected to the same operations as in Example 55, except that the mixture was melted at the temperature indicated in Table 20.

Table 20

| Item Example | Amount (part) of 4-Methacryloyloxy-phenol | Temperature of melt (°C) | Resistance to T-peeling (kg/cm) |
|---|---|---|---|
| 103 | 1.0 | 180 | 4.3 |
| 104 | 3.0 | 220 | 5.0 |
| 105 | 5.0 | 240 | 4.8 |

Examples 106 through 108

In each of the present examples, 100 parts of the same block copolymer used in Example 55 were mixed with 4-(mechacryloyloxymethyl) phenol, in an amount as indicated in Table 11, and 1.0 part of 2,5-dimethyl-2,5-di(benzoylperoxy) hexene-3, and the mixture was subjected to the same operations as in Example 55, except that said mixture was melted at a temperature as indicated in Table 21.

Table 21

| Item Example | Amount (part) of 4-(methacryloyloxymethyl) phenol | Temperature of melt (°C) | Resistance to T-peeling (kg/cm) |
|---|---|---|---|
| 106 | 1.0 | 180 | 4.5 |
| 107 | 3.0 | 220 | 5.0 |
| 108 | 5.0 | 240 | 4.7 |

Comparison Examples 1 through 12

In each of the comparison examples, 100 parts of the same block copolymer as in Example 55 were uniformly mixed with an ethylenically unsaturated compound and organic peroxide in amounts indicated in Table 22, by agitating them at a temperature of 20°C for 3 minutes. The mixture was placed in a reactor from which the inside atmospheric air was withdrawn and replaced by nitrogen gas, and heated at a temperature of 130°C, which is lower than the melting point of the block copolymer for about 6 hours in order to modify the block copolymer. During the heating period, the organic peroxide decomposed completely. The modified block copolymer was subjected to the same procedures as in Example 55. The results are indicated in Table 22. It is obvious, comparing the comparison examples with the aforementioned examples, that the propylene polymer which had been modified at a temperature lower than the melting point of the propylene polymer had poorer adhering properties than the polymer obtained in accordance with the method of the present invention.

Table 22

| Item Example | Modifying agent Type | Am't (part) | Organic peroxide Type | Am't (part) | Resistance to T-peeling (kg/cm) |
|---|---|---|---|---|---|
| 1 | Zinc acrylate | 3.0 | tert-Butyl-peroxybenzoate | 0.5 | 0.5 |
| 2 |  | 3.0 | 2,5-Dimethyl-2,5-di(benzoylperoxy)hexene-3 | 1.0 | 0.3 |
| 3 | Zinc methacrylate | 3.0 | tert-Butyl peroxybenzoate | 0.5 | 0.5 |
| 4 |  | 3.0 | 2,5-Dimethyl-2,5-di(benzoylperoxy)hexene-3 | 1.0 | 0.5 |
| 5 | Aluminum acrylate | 3.0 | tert-Butyl peroxybenzoate | 0.5 | 0.3 |
| 6 |  | 3.0 | 2,5-Dimethyl-2,5-di(benzoylperoxy)hexene-3 | 1.0 | 0.2 |
| 7 | 4-Methacryloyl- | 1.0 | tert-Butyl peroxybenzoate | 0.5 | 1.3 |
| 8 | oxyphenol | 3.0 |  | 0.5 | 2.0 |
| 9 |  | 1.0 |  | 1.0 | 1.0 |
| 10 |  | 3.0 |  | 1.0 | 1.3 |
| 11 | 4-(Methacryloyl- | 1.0 | 2,5-Dimethyl-2,5-di(benzoylperoxy)hexene-3 | 0.5 | 0.8 |
| 12 | oxymethyl) phenol | 1.0 |  | 1.0 | 0.5 |

The modified propylene polymer prepared by the method of the present invention has excellent bonding properties with various materials, for example metallic, paper, resin, glass, slate, plywood, leather and fabric articles. The following Reference Examples illustrate in detail the process of producing composite articles by using the modified propylene polymer bonding material.

Reference Examples 1 through 6

In Reference Example 1, a modified propylene polymer film having an average thickness of 100 $\mu$ which had been prepared by the same method as mentioned in Example 1, was inserted between an aluminum plate and an iron plate respectively having thicknesses as shown in Table 23. The composite was pre-heated to a temperature of 220°C for 3 minutes and then heat-pressed at a temperature of 220°C under a pressure of 10 kg/cm$^2$ for 2 minutes. The resultant composite plate had a high resistance indicated in Table 23, to peeling at an angle of 180°.

In each of Reference Examples 2 through 6, the same operations as in Reference Example 1 were repeated using two metal plates of the type and thickness indicated in Table 23. The composite plates resistances to peeling at an angle of 180° are indicated in Table 23.

num plate 0.2 mm thick and an asbestos slate 4 mm thick.

The resultant composite plate was subjected to a test to determine the shearing strength thereof. Said shearing strength was determined in accordance with the test method ASTM D-1002, except that the stretching velocity of the composite plate was 1.0 m/minute. The shearing strength of the composite plate of Example 7 was found to be 12 kg/cm$^2$. In this connection, it should be noted that in the shearing test, only the asbestos slate in the composite plate was broken, and the bonding layer remained intact. In each of the Reference Examples 8 through 17, the same operations as in Reference Example 7 were effected by using two plates of type and thickness indicated in Table 24. The shearing strengths of the composite plates are indicated in Table 24. It should be noted that in the shearing test in Reference Examples 8 through 14, the materials bonded to the metal plates were broken while the bonding layers were not, and in the shearing test in Reference Examples 15 through 17, the composite plates remained unbroken even at a shearing force of 200 kg/cm$^2$. Shearing strengths larger than 200 kg/cm$^2$ are indicated by "> 200".

Table 23

| Reference Example No. | Material | | | | Resistance to peeling at 180 degree angle (kg/cm) |
|---|---|---|---|---|---|
| | Type | Thickness (mm) | Type | Thickness (mm) | |
| 1 | Aluminum plate | 0.2 | Iron plate | 1.0 | 6.8 |
| 2 | " | 0.2 | Polypropylene sheet | 2.0 | 6.2 |
| 3 | " | 0.2 | Stainless steel plate (SUS 304 2B) | 1.0 | 8.0 |
| 4 | Stainless steel plate (SUS 304 2D) | 0.3 | Iron plate | 1.0 | 10.0 |
| 5 | " | 0.3 | Polypropylene | 2.0 | 8.0 |
| 6 | " | 0.3 | Aluminum plate | 1.0 | 9.5 |

Reference Examples 7 through 17

In Reference Example 7, the same operations as in Reference Example 1 were carried out using an alumi- Table 24

| Reference Example No. | Material | | | | Shearing strength (kg/cm$^2$) |
|---|---|---|---|---|---|
| | Type | Thickness (mm) | Type | Thickness (mm) | |
| 7 | Aluminum | 0.2 | Asbestos slate *1 | 4 | 12 |
| 8 | " | 0.2 | Plywood *2 | 3 | 17 |
| 9 | " | 0.2 | Artificial leather *3 | 2 | 4 |
| 10 | " | 0.2 | Cotton fabric | 0.3 | 7 |
| 11 | " | 0.2 | Particle board *4 | 20 | 8 |
| 12 | Stainless steel plate (SUS 304 2D) | 0.3 | Plywood | 3 | 17 |
| 13 | " | 0.3 | Natural leather | 2 | 21 |
| 14 | " | 0.3 | Cotton fabric | 0.3 | 7 |
| 15 | Aluminum plate | 4.0 | Aluminum plate | 4.0 | >200 |
| 16 | " | 4.0 | Stainless steel plate (SUS 304 2D) | 3.0 | >200 |
| 17 | Stainless steel plate | 3.0 | " | 3.0 | >200 |

Table 24-continued

| Reference Example No. | Material | | | | Shearing strength (kg/cm²) |
|---|---|---|---|---|---|
| | Type | Thickness (mm) | Type | Thickness (mm) | |
| | (SUS 304 2D) | | | | |

Note:
*1 Trademark of the asbestos slate is "UBE ASBESTOS CEMENT BOARD" made by Ube Slate Co., Ltd., Japan.
*2 Trademark of the plywood is "GOBAN Type 2" made by Murakami Wood Industry Co., Ltd., Japan.
*3 Trademark of the artificial leather is "KURALINO" made by Kurare, Ltd., Japan.
*4 Trademark of the particle board is "OKURA BOARD" made by Banboard Co., Ltd., Japan.

What we claim is:

1. A method for preparing a modified crystalline propylene polymer usable as a bonding agent, comprising heating a crystalline propylene polymer uniformly mixed with a modifying composition, said modifying composition consisting of an organic peroxide and at least one modifying agent selected from the group consisting of the ethylenically unsaturated organic compounds of the formula wherein R represents a hydrogen atom or methyl radical, and $m$ and $n$ represent 0 or 1 respectively, wherein said modifying agent is used in an amount of 0.1 to 7.0% based on the weight of said crystalline propylene polymer, wherein said organic peroxide is used in an amount of 0.1 to 5% based on the weight of said crystalline propylene polymer, and wherein said organic peroxide is used in an amount of 5 to 80% based on the weight of said modifying agent, said heating being conducted at a temperature lower than the thermal decomposing point but not lower than the melting point of said crystalline propylene polymer.

2. A method as claimed in claim 1, wherein said heating temperature is in a range from 180°C to 250°C.

3. A method as claimed in claim 1, wherein the amount of said modifying agent is in a range from 0.5 to 5.0% based on the weight of said crystalline propylene polymer.

4. A method as claimed in claim 1, wherein said organic peroxide has a one minute half-life temperature of about 160° to about 240°C.

5. A method as claimed in claim 1, wherein the amount of said organic peroxide is in a range from 0.25 to 3% based on the weight of said crystalline propylene polymer.

6. A method as claimed in claim 1, wherein said crystalline propylene polymer is selected from the group consisting of isotactic polypropylene, random and block copolymers of at most 30% by weight of at least one α-olefin other than propylene and a balance of propylene, mixtures of at most 30% by weight of at least one polymer of an α-olefin other than propylene and a balance of isotactic polypropylene and mixtures of two or more of the above-mentioned polymers and mixtures.

7. A method as claimed in claim 6, wherein said olefin other than propylene is either ethylene or butene-1.

8. A method as claimed in claim 1, wherein said crystalline propylene polymer is selected from the group consisting of random and block copolymers of 2 to 15% by weight of ethylene and a balance of propylene and mixtures of 80% by weight or more of the above-mentioned copolymer and a balance of a high density polyethylene.

9. A method as claimed in claim 1, wherein said ethylenically unsaturated organic compound of the formula (II) is selected from the group consisting of 4-acryloyloxyphenol, 4-(acryloyloxymethyl) phenol, 4-acryloyloxybenzyl alocohol, 4-methacryloyloxyphenol, 4-(methacryloyloxymethyl) phenol, 4-methacryloyloxybenzyl alcohol, and 4-(methacryloyloxymethyl) benzyl alcohol.

10. A method as claimed in claim 1, wherein said organic peroxide is selected from the group consisting of tert-butyl peroxyisopropyl carbonate, di-tert-butyl di peroxyphthalate, tert-butyl peroxyacetate, 2,5-dimethyl-2,5-di(benzoyperoxy) hexene-3, tert-butyl peroxylaurate, tert-butyl peroxymaleic acid, tert-butyl peroxybenzoate, methylethylketone peroxide, dicumyl peroxide, cyclohexanone peroxide, tert-butylcumyl peroxide and mixtures of two or more of the above-mentioned peroxide compounds.

11. A method as claimed in claim 1, wherein said heating is carried out in an extruder.

12. A modified crystalline propylene polymer usable as a bonding agent which comprises a crystalline propylene polymer modified with a modifying composition consisting of at least one modifying agent, selected from the ethylenically unsaturated organic compounds of the formula wherein R represents a hydrogen atom or methyl radical, and $m$ and $n$ represent 0 or 1, respectively, wherein said modifying agent is used in an amount of 0.1 to 7.0% based on the weight of said crystalline propylene polymer, and an organic peroxide, wherein said organic peroxide is used in an amount of 0.1 to 5% based on the weight of said crystalline propylene polymer, at a temperature not lower than the melting point and not higher than the thermal decomposing point of said crystalline propylene polymer.

* * * * *

UNITED STATES PATENT OFFICE
CERTIFICATE OF CORRECTION

PATENT NO. : 3,970,722
DATED : July 20, 1976
INVENTOR(S) : Sadahide Ogihara, Yoichi Nakamura and Osamu Fukui It is certified that error appears in the above-identified patent and that said Letters Patent are hereby corrected as shown below:

On Page 1, in the Preamble, please correct the domicile of the assignee, UBE Industries, Ltd., to --Ube, Japan-- not "Tokyo, Japan".

Signed and Sealed this

Thirty-first Day of May 1977

[SEAL]

Attest:

RUTH C. MASON
Attesting Officer

C. MARSHALL DANN
Commissioner of Patents and Trademarks